O. AND R. AMOS AND E. A. McKEE.
LOADING AND HAULING AUTOMOBILE TRUCK.
APPLICATION FILED SEPT. 25, 1918.
1,346,152.   Patented July 13, 1920.
3 SHEETS—SHEET 1.
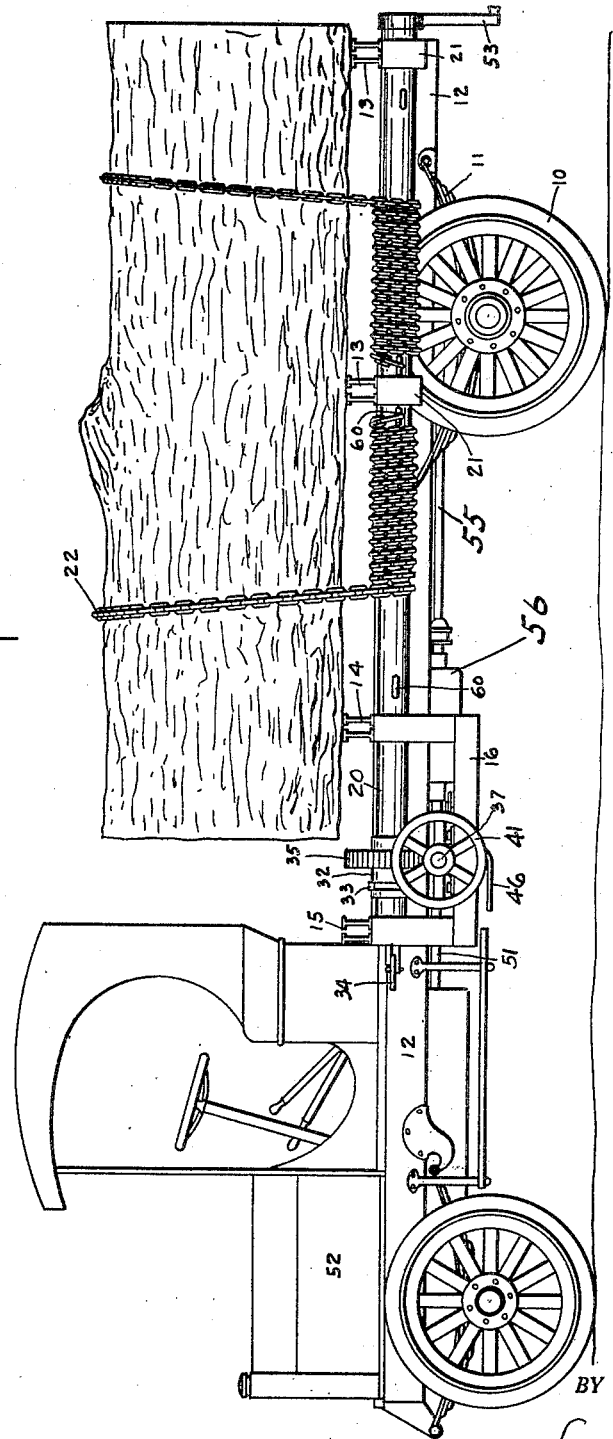
INVENTOR.
ORA AMOS
ROY AMOS
BY  EPHRAIM A. McKEE
Lockwood & Lockwood
ATTORNEY.

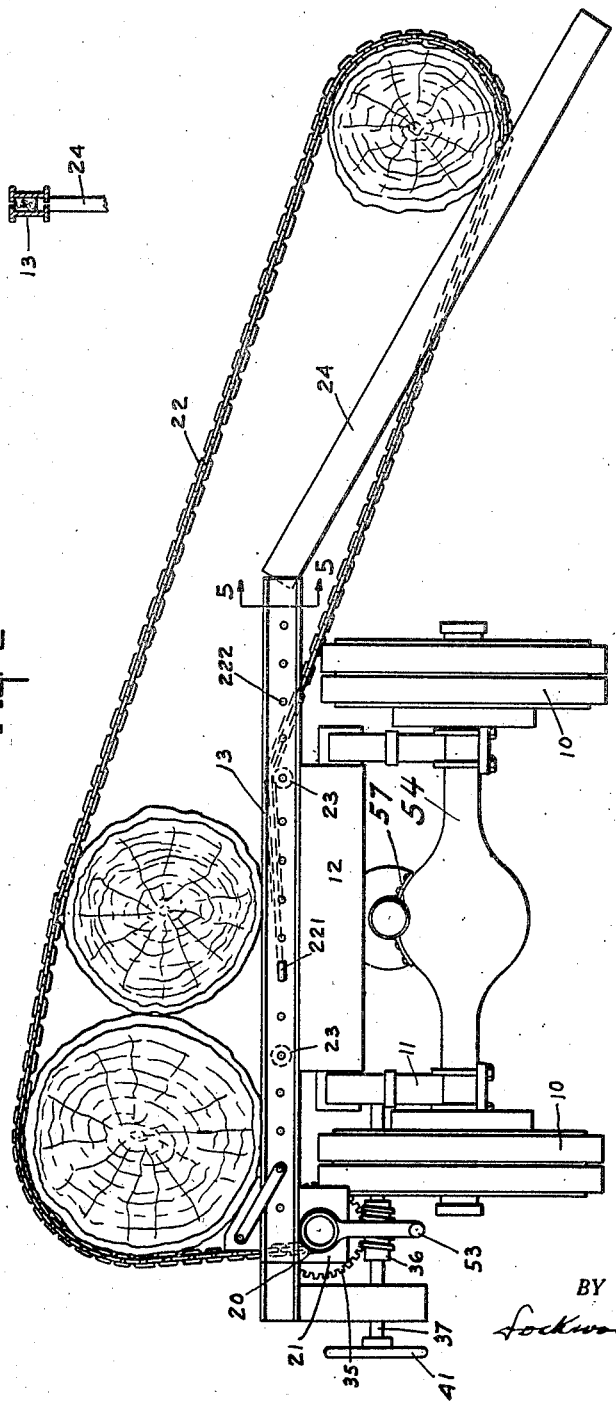

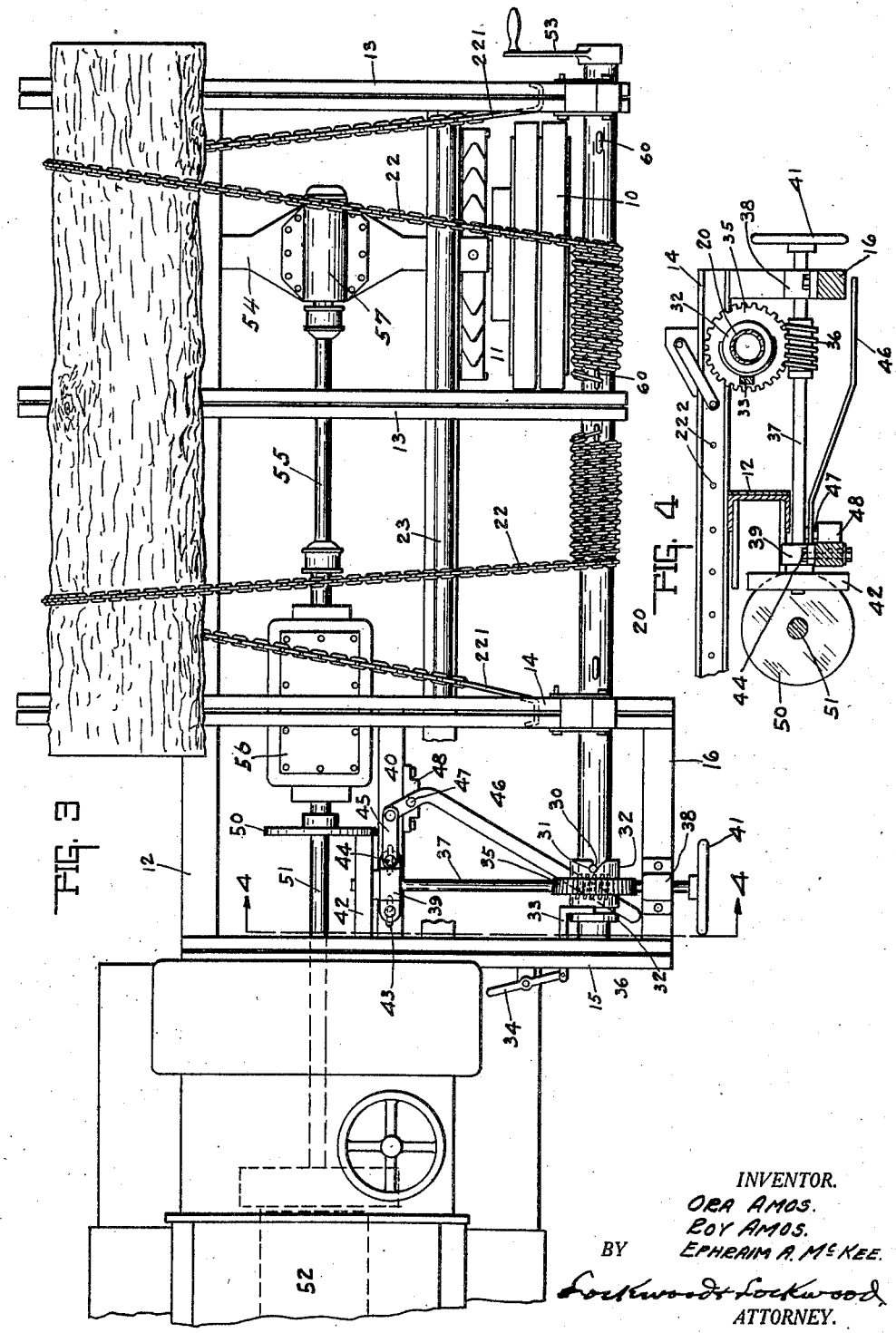

UNITED STATES PATENT OFFICE.

ORA AMOS, ROY AMOS, AND EPHRAIM A. McKEE, OF EDINBURG, INDIANA.

LOADING AND HAULING AUTOMOBILE-TRUCK.

1,346,152.      Specification of Letters Patent.      Patented July 13, 1920.

Application filed September 25, 1918. Serial No. 255,620.

*To all whom it may concern:*

Be it known that we, ORA AMOS, ROY AMOS, and EPHRAIM A. McKEE, citizens of the United States, and residents of Edinburg, county of Johnson and State of Indiana, have invented a certain new and useful Loading and Hauling Automobile-Truck; and we do hereby declare that the following is a full, clear, and exact description thereof, reference being had to the accompanying drawings, in which like numerals refer to like parts.

The object of this invention is to provide automobile trucks with practical and efficient means for loading and hauling logs pipes and other heavy objects and where the power of the engine which drives the automobile is utilized for operating the loading mechanism and a further object is to accomplish the foregoing purpose by very simple and easily mounted apparatus free from large levers, brakes and like constructions that have been used heretofore, in connection with the truck for loading purposes.

A feature of the invention consists in mounting at one side of the frame of the truck, a windlass shaft for the winding chains or cables used in the loading operation for rolling logs or pipes up on the truck, and means driven by the motor of the truck for operating such shaft, and in so mounting the windlass shaft that it will extend parallel with the engine shaft and having its forward end extended forwardly to or beyond the rear end of the engine shaft, and having transmission means extending substantially at right angles between the windlass and engine shafts for driving the windlass shaft. This makes a convenient, strong and effective loading outfit and the loading mechanism is out of the way and below the top surface of the truck and at no time does any part extend above the truck, excepting the chains as they pass over logs, or other objects being loaded.

A further feature of the invention is the provision of driving means between the driving shaft and windlass shaft so arranged that they will form a positive lock for preventing the loading chains from casually unwinding from the windlass.

A further feature of the invention is in so constructing the loading mechanism that all the parts thereof may be attached to the different makes of trucks without changing or altering any of the truck parts.

Along with the foregoing feature is that of providing roller shafts in the frame and below the top thereof on which the chains ride while the log is being drawn up on the truck. These are far enough below the top surface of the truck frame to prevent the logs or the like which have been already loaded from interfering with the chains on the rollers.

A further feature of the invention is in providing means for attaching the loading chains to the windlass, so that when logs or similar objects are being loaded upon the truck, they may be readily guided, or the positions thereof changed so as to bring them into position to travel up onto the truck, in proper alinement.

The full nature of the invention will be understood from the accompanying drawings and the following description and claims:

In the drawings, Figure 1 is a side elevation of the truck. Fig. 2 is an end elevation of a truck being loaded with logs. Fig. 3 is a plan view of the truck with a log being loaded thereon, and parts being broken away. Fig. 4 is a section on the line 4—4 of Fig. 3. Fig. 5 is a section on the line 5—5 of Fig. 2.

In the drawings there is shown an automobile truck having wheels 10, springs 11 and a bed 12 supported thereon. Load supporting rails 13 and 14 are secured transversely upon the bed 12 and extend laterally beyond the wheels. The two rear rails 13 are of equal lengths and the front rail 14 extends farther to the left than the rails 13, as shown in Fig. 2, and there is a further transverse rail 15 in front of and parallel with the rail 14 and extending at one end laterally to the left as far as the rail 14 and to the outer ends of the rails 14 and 15 a longitudinal bar 16 is secured. These rails 13, 14 and 15 are each formed of a pair of I-beams bolted together, as shown in Fig. 5. The foregoing constitutes the truck frame, namely, the bed, and the rails 13, 14 and 15.

All the rails 13, 14 and 15 extend far enough beyond the wheels of the truck for the mounting of a windlass shaft 20 in the bearings 21 on the underside of said rails. Loading chains 22 are secured to said windlass shaft, and to anchors 221 insertible in holes 222 in the rails 13 and 14 appreciably below the top surfaces thereof and the chains ride and rest on the rollers 23. When loading logs the chains are passed around a log on the ground and then the windlass shaft 20 is operated and the log rolled up on the beams 24 that are placed with one end resting on the ground and the other end resting between the I-beams forming the rails 13 and 14.

The windlass shaft 20 is driven forward for raising logs by the means best shown in Figs. 3 and 4. Said shaft has in it pins 30 adapted to be engaged by notches 31 in a sleeve 32 slidable on the windlass shaft by means of a yoke 33 and hand lever 34. A worm gear 35 is secured on said sleeve and it meshes with a worm 36 on a shaft 37 extending transversely and mounted in bearings 38 and 39 on the bars 16 and 40. A hand wheel 41 is secured to the outer end of the shaft 37 and a friction wheel 42 is secured to the inner end thereof. The bearing 39 is slidable longitudinally of the beam 40 as the bearing has longitudinal slots 43 through which bolts 44 from the beam 40 extend. The sliding movement of the bearing is caused by a link 45 connected with a lever 46 fulcrumed at 47 to a bracket 48 on the beam 40.

By operating the lever 46, the friction wheel 42 is brought and held in frictional engagement with the side surface of a friction disk 50 secured on the shaft 51 of the engine 52.

Therefore, by means of the engine operating through shaft 51, friction disk 50 friction wheel 42, shaft 37, worm 36, gear 35, sleeve 32 and pin 31, the windlass shaft 20 is driven so as to wind up the chains 22.

The hand wheel 41 is to tighten up the chains before the friction wheel 42 is thrown into frictional engagement with the disk 50. To release and take up sufficient slack in the chains 22, the lever 34 is operated to shift the sleeve 32 out of engagement with the pin 30 and then the windlass shaft is given an unwinding movement by the crank 53 at the rear end of the truck.

The rear axle 54 and the rear wheels 10 are driven, to propel the truck, by extending a truck propelling shaft 55 from the usual form of transmission gear system, or releasable connection 56, forming a connection between the engine driven shaft 51 and the truck propelling shaft 55, to the usual form of differential system 57 connected to the rear axle 54, and by positioning the transverse shaft 37 forwardly of the releasable connection 56, the motor 52 may be employed for operating the windlass shaft without imparting driving motion of the truck.

The windlass shaft 20 extends parallel with the driving shaft 51 of the motor and the forward end of the windlass shaft extends forwardly a sufficient distance beyond the transmission gear system or releasable connection 56 that the driving shaft 37 will extend substantially at right angles to the windlass 20 and engine shaft 51. By providing the worm gear 35 and the worm 36 for transmitting power from the driving shaft to the windlass, a positive lock is provided which will prevent the chains 22 from unwinding from the windlass 20, thus holding the object being loaded at whatever point the same may be positioned when the driving shaft is disconnected from the motor shaft.

It sometimes occurs that logs or other objects being loaded are resting in a position out of alinement with the truck, and in order to position the same so that they will move directly onto the truck and be in proper alinement, a plurality of anchoring points 60 are provided on the windlass 20 so that by shifting the chains from one anchoring point to the other and then winding the chains onto the windlass the position of the logs or the like will be regulated by the chains so as to bring them in position to be drawn onto the truck. This operation can be further facilitated by using but a single chain during the positioning of the log, or the like.

It is thus seen that the means for operating the chains are all mounted below the tops of the various rails so that they are entirely out of the way; and the windlass shaft 20 is at one side of the truck and under the rails. Also the chains themselves are not in the way as the rollers 23 are sufficiently below the top of the rails as to never be pinched by the logs or other objects on said rails.

The invention claimed is:

1. The combination with a motor driven truck having a frame for receiving loads, parts of said frame having series of holes, of loading chains, hooks at one end thereof for removable engagement with the holes in said frame, and a windlass shaft driven by the truck motor and mounted below the top surface of the frame and to which the other ends of said chains are secured and whereby they are operated.

2. The combination with a truck having a motor for driving it, a frame for receiving a load, and loading chains coöperating therewith, of a windlass shaft extending longitudinally of the truck and mounted to the frame thereof along one side of the truck for operating the chains, a shaft at right angles to the windlass shaft and the driving shaft of the truck motor, a worm drive connecting said windlass shaft and right angled shaft, a friction wheel on said right angled shaft, and a friction disk on the driving shaft of the truck motor for driving the friction wheel for operating the windlass shaft, said shafts and the means for driving the same from the motor being located below the top of said frame.

3. The combination with a motor driven truck having a frame for receiving a load, of loading chains with one end removably connected to said frame below the top thereof, a windlass shaft mounted in connection with said frame and below the top thereof and extending along one side of the truck and with which the ends of said chains are secured, and a frictional connection between the driving shaft of the truck motor and said windlass shaft for driving it and being located below the top of said windlass shaft for driving it and being located below the top of said frame.

4. The combination with a truck having a motor and motor driven shaft for propelling it, a bed, load receiving rails secured upon said bed and extending transversely of the truck and beyond the bed, chains removably attached to said rails, a windlass shaft mounted on the underside of said rails and at one side of the truck for operating the chains, and means at right angles to and adapted to be frictionally engaged with the driving shaft of the truck motor for operating said windlass shaft.

5. The combination with a motor driven truck, of a motor driven shaft, a windlass shaft extending longitudinally of the truck and mounted at one side thereof, means for driving said windlass shaft, means for frictionally engaging said driving means with the driving shaft of the motor, and extending at right angles to the motor shaft, means for disconnecting said driving means and windlass shaft, and manually operated means for reversing the rotation of the windlass shaft.

6. The combination with a motor driven truck, of a windlass shaft extending longitudinally of the truck and mounted at one side thereof, a motor driven shaft parallel with the windlass shaft, a transversely extending shaft extending from the windlass shaft to the motor driven shaft, a worm gear on the windlass shaft, a worm on said transverse shaft, means to move said worm gear into or out of engagement with said worm, a friction wheel at the inner end of the transverse shaft, a friction disk on the motor driven shaft, and means to move said friction wheel into or out of engagement with the friction disk.

7. The combination with a motor driven truck, of a windlass shaft, a motor driven shaft parallel with the windlass shaft and spaced therefrom, a transversely extending shaft connecting said windlass shaft with the motor driven shaft, a worm gear slidable on the windlass shaft, means to move said worm gear longitudinally of the windlass shaft, parts of said worm gear having inclined notches, and pins on the windlass shaft adapted to engage said notches to cause the windlass shaft to rotate with said worm gear in elevating the load.

8. The combination with a motor driven truck, a motor thereon, and a motor driven shaft, of a windlass extending longitudinally of the truck and parallel to said motor driven shaft, a transversely extending shaft connecting the motor driven shaft and the windlass shaft, a worm drive between the transverse shaft and the windlass shaft, a friction wheel carried by the transverse shaft, and a lever for moving the friction wheel into or out of engagement with the disk on the motor driven shaft.

In witness whereof we have hereunto affixed our signatures.

ORA AMOS.
ROY AMOS.
EPHRAIM A. McKEE.

Witnesses:
BERTHA STOUT,
JOHN F. HYDE.